United States Patent
Gumma et al.

(10) Patent No.: US 7,925,899 B2
(45) Date of Patent: Apr. 12, 2011

(54) METHOD, SYSTEM, AND APPARATUS FOR RUNTIME POWER ESTIMATION

(75) Inventors: Madhu Gumma, Austin, TX (US);
Anand Ramachandran, Austin, TX (US); Eric Samson, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 698 days.

(21) Appl. No.: 11/323,136

(22) Filed: Dec. 29, 2005

(65) Prior Publication Data
US 2007/0157035 A1 Jul. 5, 2007

(51) Int. Cl.
*G06F 1/00* (2006.01)
*G01R 21/00* (2006.01)
*G06G 7/62* (2006.01)
*H03K 17/693* (2006.01)

(52) U.S. Cl. ............ 713/300; 713/320; 702/60; 703/13; 716/4

(58) Field of Classification Search .................. 713/300, 713/320; 702/60; 703/13; 716/4
See application file for complete search history.

(56) References Cited

U.S. PATENT DOCUMENTS

| | | | |
|---|---|---|---|
| 6,212,665 B1 * | 4/2001 | Zarkesh et al. | 716/4 |
| 6,493,659 B1 * | 12/2002 | Takita | 703/14 |
| 6,735,744 B2 * | 5/2004 | Raghunathan et al. | 716/4 |
| 6,871,119 B2 | 3/2005 | Samson et al. | |
| 7,174,194 B2 * | 2/2007 | Chauvel et al. | 455/574 |
| 7,337,339 B1 * | 2/2008 | Choquette et al. | 713/320 |
| 2005/0044429 A1 * | 2/2005 | Gaskins et al. | 713/300 |

OTHER PUBLICATIONS

Isci, C., et al., "Runtime Power Monitoring in High-End Processors: Methodology and Empirical Data," Proceedings of the International Symposium on Microarchitecture, pp. 93-104, 2003.
Bellosa, F., "The Benefits of Event-Driven Energy Accoutning in Power-Sensitive Systems," Proceedings of SIGOPS European Workshop, pp. 37-42, 2000.
Joseph, R., et al., "Run-Time Power Estimation in High Performance micorporcessors," pp. 135-140., ISLPED, Aug. 6-7, 2001, ACM 1-58113-271-5/01/0008.
Samson, E., et al., "Interface Material Selection and a Thermal Management Technique in Second-Generation Platforms Built on Intel Centrino Mobile Technology," pp. 75-86, vol. 9, Issue 1, Feb. 17, 2005, ISSN 1535-864X, Intel Technology Journal.

\* cited by examiner

*Primary Examiner* — Stefan Stoynov
(74) *Attorney, Agent, or Firm* — Kacvinsky Daisak PLLC

(57) ABSTRACT

Assertions of sentinel nodes within a device may be used to calculate device power consumption at runtime. These power estimates may be used to estimate a device temperature or leakage power, and/or may be used to make device throttling decisions.

14 Claims, 3 Drawing Sheets

METHOD, SYSTEM, AND APPARATUS FOR RUNTIME POWER ESTIMATION

BACKGROUND

Embodiments of the present invention relate to power management techniques for computing devices and more specifically to estimation of dynamic power consumption of a device at runtime.

As electronic devices continue to become smaller in size and higher performance, heat removal and power density of semiconductor devices become increasingly challenging. The ability to measure the power dissipation of a chip at runtime may enable temperature- and reliability-aware computing. Runtime power estimates may enhance the ability of dynamic power management techniques to evaluate power-performance tradeoffs and may deliver improved system performance.

BRIEF DESCRIPTION OF THE DRAWINGS

An understanding of embodiments of the present invention may be obtained from the following detailed description in conjunction with the following drawings, in which.

DETAILED DESCRIPTION

Figure 1:
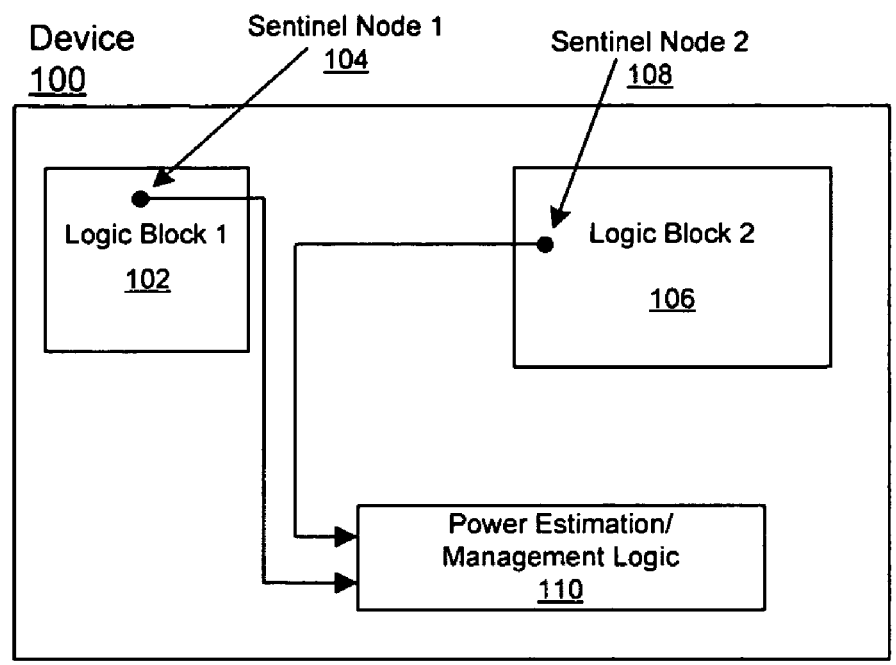
FIG. 1 is an illustration of a device implementation of sentinel nodes according to some embodiments.

In the following description, for purposes of explanation, numerous details are set forth in order to provide a thorough understanding of embodiments of the present invention. However, it will be apparent to one skilled in the art that these specific details are not required in order to practice the present invention as hereinafter claimed.

Embodiments of the present invention concern estimation of the dynamic power consumption of a semiconductor device at runtime. Although the following discussion centers on semiconductor devices commonly used in mobile computing platforms, such as memory controller devices, input/output controller devices, graphics controllers, and microprocessors, it will be understood by those skilled in the art that embodiments of the present invention as hereinafter claimed may be practiced in support of any type of semiconductor device.

In some embodiments, dynamic power consumption ($P_{dyn}$) of a circuit may be calculated using the following equation:

$$P_{dyn} = C*V^2*f*a$$

Where, C is the capacitance of the circuit, V is the supply voltage, f is the circuit clock frequency, and a is an activity or switching factor. Because the capacitance (C), supply voltage (V) and frequency (f) are fixed quantities, it is possible to estimate the dynamic power consumption of a device at runtime by estimating the activity factor of the device (a) at runtime. The activity factor is an indication of the amount of work done in a logic circuit and may be determined by the switching activity of the circuit.

For a chip or device, the total power consumption is equal to the sum of power consumed by each logic block within the device. A logic block may be an entire device, or a logic block may define a smaller portion within the device. For example, a logic block may encompass a front side bus interface or a memory controller interface. In other embodiments, a logic block may encompass only the read portion or write portion of such an interface. In yet other embodiments, a logic block may include as few as one gate or signal, or may include only a few gates or signals. Thus, a chip or device may be comprised of one or more logic blocks.

The total power consumption for a chip or device may be computed by summing the power of each logic block within the device as follows:

$$P_{chip} = P_{LogicBlock1} + \ldots + P_{LogicBlockN}$$

Thus, $P_{chip} = (C*V^2*f*a)_{LogicBlock1} + \ldots + (C*V^2*f*a)_{LogicBlockN}$ $C*V^2*f$ is a constant value for each logic block. In this equation, only the activity factor, a, changes depending on the activity of each logic block. Thus, the total power of the device, $P_{chip}$, may be computed using the following equation:

$$P_{chip} = (W_1*A_1) + (W_2*A_2) + \ldots + (W_N*A_N)$$

Here, $W_i$ is a constant, weighted value representing $C*V^2*f$ for logic block i. $A_i$ is equal to the number of assertions of a sentinel signal or sentinel node representing logic block i, and $A_i$ is proportional to the architectural activity of logic block i. A sentinel node is a signal in a logic block whose activity is representative of the architectural activity of the entire logic block. A sentinel node toggles (e.g. is asserted or de-asserted) whenever its associated architectural event occurs. An architectural event may be, but is not limited to, an event such as a read, write, a logic operation (e.g. add), or other event in the device which causes total power to increase. For the purposes of this disclosure, an assertion, de-assertion, toggle, and/or state change of the sentinel node may all serve the purpose of indicating architectural activity within a logic block, and are thus hereinafter referred to as "assertions" of the sentinel node.

The weighted value, $W_i$, for each block may be calculated by simulating a device with test inputs and measuring power consumption. By performing a linear regression analysis on the $P_{chip}$ equation above, a weight $W_i$ may be obtained for each logic block in the chip. Each logic block may have a different weighted value, $W_i$. For example, if approximately the same amount of architectural activity as indicated by sentinel node assertions occurs in each of two logic blocks, but the first logic block includes more gates and/or consumes more power, then the weighted value for the first logic block may be greater than the weighted value for the second logic block.

Thus, the total average device power may be calculated by adding a logic block's weighted value, $W_i$, to a total average power value each time a sentinel node in the block is asserted. Therefore, by monitoring a selected set of signals that reflect the activity of the logic blocks they represent, the power consumption for a device may be estimated.

FIG. 1 illustrates sentinel nodes that may be used to measure architectural activity in a device according to some embodiments. A device or chip (100) may include one or more logic blocks (102,106), and each logic block may include one or more sentinel nodes (104,108). Device (100) may be any type of device for which it is desirable to compute runtime power estimations, including, but not limited to, processors, chipset devices, memory devices, graphics devices, application specific integrated circuits (ASICS) or any other type of electronic component.

Each logic block includes one or more sentinel nodes (104, 108). A sentinel node may be selected so as to reflect the activity of the corresponding logic block it represents. For example, sentinel node 104 is selected such that its activity is a representation of the overall architectural activity of logic block 102.

The sentinel nodes in each logic block may be monitored by power management logic (110). The power management logic may monitor assertions of each sentinel node in each logic block. Each time a sentinel node is asserted, a corresponding power number is added to a running total of the current device power estimate.

The device power estimate may be stored in a one or more registers, latches, or volatile or non-volatile memory. The device power estimate may be calculated over a predetermined time period by adding the number of sentinel node assertions during that time period. In some embodiments, it may be possible to reset the device power estimate as desired.

By measuring the number of assertions, toggles, or state changes of each sentinel node, the power consumption of each logic block may be estimated by adding a predetermined weighted value to a logic block power total each time the sentinel node for the logic block is asserted and averaged over a pre-defined window of time. Similarly, the power consumption for the entire device may be estimated by monitoring all sentinel nodes, and each time a sentinel node is asserted, adding and averaging the weighted value corresponding to the sentinel node to a device power total. This allows one to estimate device power at runtime.

Additionally, the assertion counts of each sentinel node may be tracked, for example, by storing the counts in one or more registers, latches, and/or in other volatile or non-volatile memory locations. The assertion counts may be reset as needed to perform any desired power or temperature calculations.

The power estimate for each logic block and/or for the device as a whole may be used to predict the temperature of the device at runtime using the following equation:

$$T_n = (1-\alpha)*T_{n-1} + (\alpha*k*P_n)$$

Where, $T_n$ is the temperature of the device at time n, $P_n$ is the average power consumption of the device in the $n^{th}$ time interval, $\alpha$ is the thermal time constant of the device, and k is a scaling constant.

Using the runtime estimation of device power based on sentinel node assertions, as described above, in conjunction with an initial value for device temperature, this equation may be used to calculate current or future device temperatures, $T_n$. Furthermore, it may be possible to calculate temperatures for each individual logic block using runtime estimations of logic block power.

The temperature predictions may be used by the power management logic to throttle device activity on a per-device or per-logic block basis when the calculated device temperature goes above certain predefined threshold values.

In some embodiments, the sentinel nodes may be used to perform leakage power calculations. In order to ascertain leakage power at runtime, temperature variations in the device or block must be known or estimated. By performing temperature calculations similar to those described above, the estimated temperature values can in turn be used to estimate leakage power at runtime.

Figure 2:
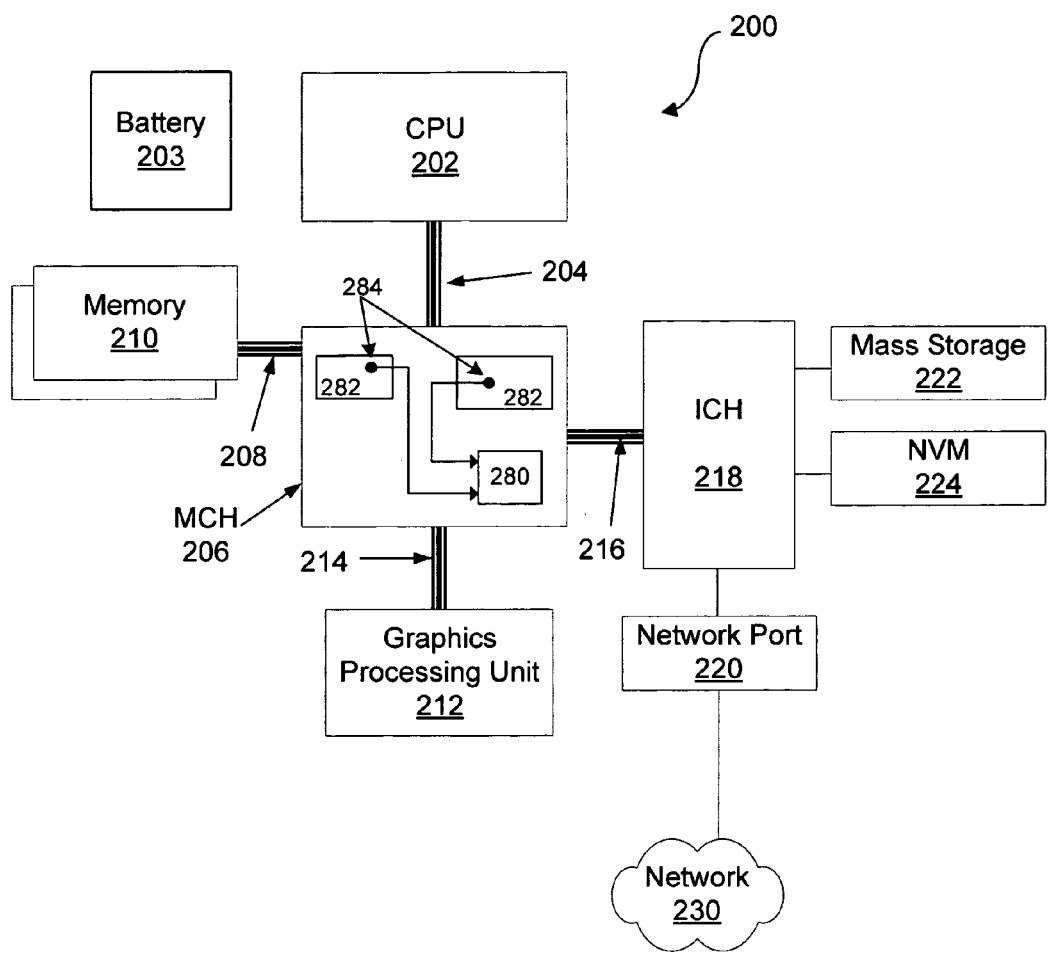
FIG. 2 is an illustration of a system block diagram according to some embodiments.

FIG. 2 illustrates a system block diagram according to some embodiments. The system (200) includes at least a processor or CPU (202), memory controller device (206), I/O controller device (218), and one or more memory devices (210). Note that in some embodiments, the memory controller device and/or the I/O controller device may be integrated into the CPU/processor.

The system may also include a network port or interface (220), and may be capable of being coupled to a wired or wireless network (230). The memory controller device (206) is coupled to the CPU (202) by a bus (204). The memory controller device (206) provides the CPU (202) with access to one or more memory devices (210), to which the memory controller device (206) is coupled by a memory bus (208).

A graphics processing unit (212) may be coupled to the memory controller device via a bus (214). An I/O controller device (218) may be coupled to the memory controller device (206) by a bus (216). The I/O controller device (218) may be coupled to a network port (220), capable of connecting to a network (230). The I/O controller device (218) may also be coupled to a mass storage device (222) and/or non-volatile memory (224). A battery (203) or other power supply may provide power to the system.

Together, these components form a system (200) that is capable of supporting the execution of machine readable instructions by CPU (202), and the storage of data, including instructions, within memory devices (210). One or more components in the system may include a plurality of logic blocks, each logic block having one or more sentinel nodes which is monitored by power management logic.

In one illustrative embodiment, as shown in FIG. 2, the memory controller device includes logic blocks (282). Each logic block includes sentinel nodes (284) which are monitored by power management logic (280). The power management logic (280) may monitor assertions of the sentinel nodes, and may add a corresponding weighted power value to a total device power value each time a sentinel node is asserted, as described above. The power management logic may also track a total power value for each logic block. The device and logic block power information may be used by the power management logic to determine a breakdown of total device power consumption by logic block, and may further be used to calculate a device temperature and/or a logic block temperature. In some embodiments, all or portions of the power management logic may be in another device or chip.

Using the power consumption and/or temperature information calculated based on sentinel node assertions, the power management logic may be able to take advanced throttling actions, such as throttling the entire memory controller device (206), or throttling specific portions of the memory controller device, such as one or more logic blocks, rather than throttling the entire chip.

In other embodiments, other components of the system may include power management logic and sentinel nodes to monitor and estimate power consumption as described above. These components may include, but are not limited to, the processor (202), the I/O controller device (218), the graphics processing unit (212), or the memory device(s) (210). For example, the I/O controller device (218) may include a plurality of logic blocks having sentinel nodes coupled to power management logic to monitor the sentinel nodes and calculate device power estimates and/or device temperature.

Figure 3:
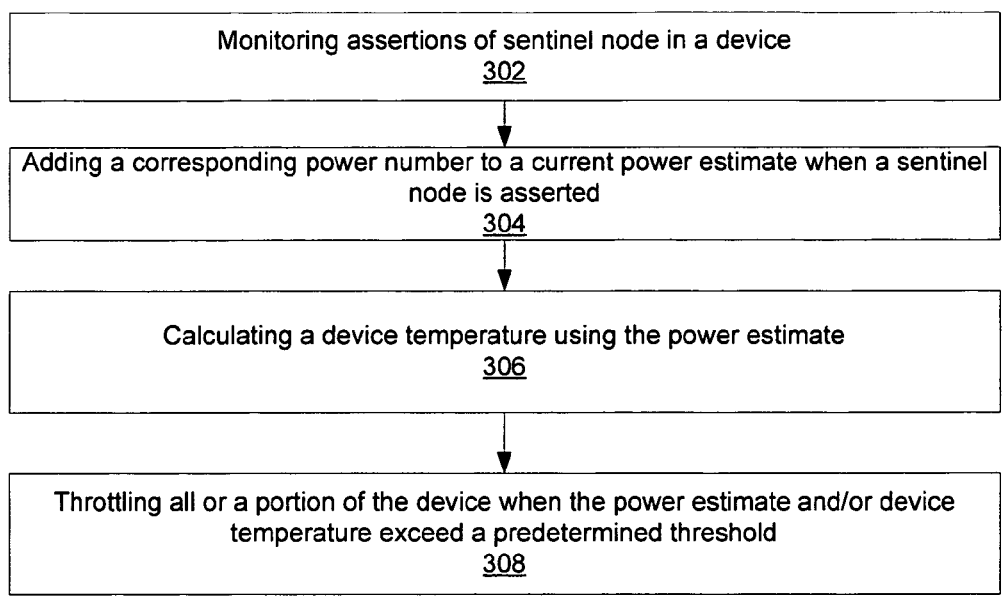
FIG. 3 is a flow diagram according to some embodiments.

FIG. 3 is a flow diagram according to some embodiments of the invention. As shown in block 302, assertions of a sentinel node in a device are monitored. Sentinel nodes are described in detail above, in conjunction with FIG. 1.

Each time a sentinel node is asserted, a corresponding power number is added to a current power estimate (304). For example, for each assertion of a sentinel node, a weighted value corresponding to that particular node may be added to the power estimate. If another sentinel node is asserted, a weighted value corresponding to that sentinel node is added to the power estimate. In this manner, a power estimate may be calculated. The power estimate may be reset periodically, for example, after a predetermined amount of time or after a specified event occurs in the device.

Additionally, assertion counts for each sentinel node may be tracked and/or stored separately for each logic block. This may allow power estimates to be calculated for portions of the device as well as the device as a whole.

The power estimate may then be used to calculate an estimated temperature for the device (306), as described above in conjunction with FIG. 1.

If the power estimate exceeds a predetermined threshold, and/or if the calculated temperature exceeds a predetermined threshold, all or portions of the device may be throttled (308). Throttling may include reducing power or reducing power dissipation by the component. Throttling may be done by reducing the operating frequency of a device, reducing power to the device or one or more blocks within the device, disabling one or more logical blocks in the device, or in any other way which would reduce the power or power dissipation of the component.

Thus, a method, apparatus, and system for runtime power estimation are disclosed. In the above description, numerous specific details are set forth. However, it is understood that embodiments may be practiced without these specific details. In other instances, well-known circuits, structures, and techniques have not been shown in detail in order not to obscure the understanding of this description. Embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

We claim:

1. A device, comprising:
a plurality of logic blocks each including at least one sentinel node, wherein the one or more sentinel nodes are to be asserted in response to each architectural event in a respective one or more of the plurality of logic blocks where a sentinel node is located; and
power management logic coupled to the plurality of logic blocks to add a value to a power estimate upon each assertion of the one or more sentinel nodes, to estimate power for each logic block based on a total number of assertions for the one or more respective sentinel nodes for that logic block and to estimate power for the device based on the power estimate for each logic block, wherein the sentinel node comprises a node within the logic block, the sentinel node selected to represent the activity of the corresponding logic block.

2. The device of claim 1, wherein the power management logic is further to throttle the device when the power estimate for the device reaches a predetermined value.

3. The device of claim 1, wherein the power management logic is further to throttle the logic block when the power estimate for the logic block reaches a predetermined value.

4. The device of claim 1, wherein the power management logic is further to reset the value of the power estimate for the plurality of logic blocks or for the device after a predetermined time period.

5. The device of claim 1, wherein the power management logic is further to reset the value of the power estimate for the plurality of logic blocks or for the device after a predetermined event occurs.

6. The device of claim 1, wherein the value is a scaled number representing a capacitance of one or more logic blocks times a squared supply voltage for one or more logic blocks times a clock frequency for one or more logic blocks.

7. The device of claim 1, wherein the power management logic is further to calculate a temperature using the power estimate for the plurality of logic blocks or for the device.

8. A method comprising:
monitoring each assertion of one or more sentinel nodes each in one of a plurality of logic blocks of a device;
adding a corresponding power number to a device power estimate each time one or more of the sentinel nodes is asserted;
estimating power for each of the plurality of logic blocks based on a total number of assertions of the corresponding one or more sentinel nodes for each logic block; and
estimating power for the device based on the power estimate for each logic block, wherein the sentinel node comprises a node within the logic block, the sentinel node selected to represent the activity of the corresponding logic block.

9. The method of claim 8, further comprising adding the corresponding power numbers to a logic block power estimate when each sentinel node is asserted.

10. The method of claim 9, further comprising throttling one or more of the plurality of logic blocks when a logic block power estimate reaches a predetermined threshold value.

11. The method of claim 9, further comprising resetting the logic block power estimate after a predetermined time period.

12. The method of claim 8, further comprising throttling the device when the device power estimate reaches a predetermined threshold value.

13. The method of claim 8, further comprising resetting the device power estimate after a predetermined time period.

14. The method of claim 8, further comprising calculating a temperature of the device based on the device power estimate.

* * * * *